United States Patent
Chiou et al.

(10) Patent No.: US 8,760,647 B2
(45) Date of Patent: Jun. 24, 2014

(54) MICROSCANNING SYSTEM WITH RELAY LENS DEVICE AND HYPER-SPECTROMETER DEVICE

(75) Inventors: Jin-Chern Chiou, Taichung (TW); Ming-Hsui Tsai, Taichung (TW); Mang Ou-Yang, Taichung (TW); Shuen-De Wu, Taichung (TW); Yao-Fang Hsieh, Taichung (TW); Ting-Wei Huang, Taichung (TW); Yung-Jiun Lin, Taichung (TW)

(73) Assignee: China Medical University, Taichung (TW)

(*) Notice: Subject to any disclaimer, the term of this patent is extended or adjusted under 35 U.S.C. 154(b) by 221 days.

(21) Appl. No.: 13/101,681

(22) Filed: May 5, 2011

(65) Prior Publication Data
US 2012/0120394 A1 May 17, 2012

(30) Foreign Application Priority Data
Nov. 15, 2010 (TW) ............................. 99139176 A

(51) Int. Cl.
*G01J 3/28* (2006.01)

(52) U.S. Cl.
USPC ........................................................ 356/328

(58) Field of Classification Search
CPC ..... G01J 3/2803; G01J 3/2823; G01J 3/2889; G01J 3/32
USPC ........................................ 356/326, 328–334
See application file for complete search history.

(56) References Cited

U.S. PATENT DOCUMENTS

| | | | | |
|---|---|---|---|---|
| 5,262,815 A | * | 11/1993 | Aumiller | 396/2 |
| 5,705,821 A | * | 1/1998 | Barton et al. | 250/458.1 |
| 6,166,373 A | * | 12/2000 | Mao | 250/226 |
| 6,495,818 B1 | * | 12/2002 | Mao | 250/226 |
| 7,636,158 B1 | | 12/2009 | Pawluczyk et al. | |
| 2006/0250616 A1 | * | 11/2006 | Pettipiece et al. | 356/456 |
| 2010/0053612 A1 | * | 3/2010 | Ou-Yang et al. | 356/329 |
| 2010/0328659 A1 | * | 12/2010 | Bodkin | 356/326 |

OTHER PUBLICATIONS

Intellectual Property Office, Ministry of Economic Affairs, R.O.C., "Office Action", Aug. 30, 2013, Taiwan.
State Intellectual Property Office of the People's Republic of China, "Office Action", China, Nov. 18, 2013.
Japan Patent Office, "Decision of Rejection", Nov. 12, 2013, Japan.

* cited by examiner

*Primary Examiner* — Tarifur Chowdhury
*Assistant Examiner* — Michael P Lapage
(74) *Attorney, Agent, or Firm* — Morris, Manning & Martin, LLP; Tim Tingkang Xia, Esq.

(57) ABSTRACT

A microscanning system including a microscope, a relay lens device, a stepping motor and a hyper-spectrometer is disclosed. The microscope is adapted to acquire and enlarge an image of an object to generate an enlarged image which is a 2D image distributed along the first direction and second direction. The relay lenses device disposed behind the microscope receives and transfers the enlarged image outputted by the microscope. The stepping motor electrically connected to the relay lens device reciprocates the relay lens linearly in the first direction device in a stepwise manner along the second direction. The hyper-spectrometer disposed behind the rely lens device receives the partial enlarged images of the object along the first direction that are transferred by the relay lens device sequentially along the second direction, and transform the partially enlarged images into the corresponding spectrum information.

8 Claims, 3 Drawing Sheets

MICROSCANNING SYSTEM WITH RELAY LENS DEVICE AND HYPER-SPECTROMETER DEVICE

CROSS-REFERENCES TO RELATED APPLICATIONS

This non-provisional application claims priority under 35 U.S.C. §119(a) on Patent Application No. 099139176 filed in Taiwan, R.O.C. on Nov. 15, 2010, the entire contents of which are hereby incorporated by reference.

BACKGROUND OF THE INVENTION

1. Field of the Invention

The present invention provides an optical image acquisition device and an operating method thereof, and more particularly, to a microscanning system for acquiring a two-dimensional (2D) image and an operating method thereof.

2. Descriptions of the Related Art

A conventional microscope spectrum measuring system acquires spectrum information of an image of an object under testing done through dot measurement. To be more specific, the microscope spectrum measuring system scans and acquires the image through the movement of either the object or a measuring device as acquiring a spectral image of the object under test.

For example, when the object under testing is a biopsy specimen, the conventional measuring system comprises a conventional microscope and a conventional line-scanning hyper-spectrometer for acquiring an image and spectrum information of the tiny biopsy specimen. First, the user places the biopsy specimen on a platform using the stepping mechanism of the conventional microscope, and then controls the displacement of the platform along two directions (i.e., an X direction and a Y direction) by means of a precision stepping motor for acquiring a 2D image of the biopsy specimen and the corresponding spectrum information thereof.

To accurately detect the biochemical characteristics of tiny objects under testing, nanoscale photoelectric detection technologies have emerged and have gradually become the primary development tendency. Because biopsy specimens are generally sized on the nanoscale, increased requirements are imposed on the precision of displacement of the stepping mechanism platform in the two directions. It is worth noting that the conventional stepping mechanism platform with a piezoelectric actuator has disadvantages, including difficulty calibrating and inadequate accuracy; consequently, it is costly to produce a mechanism platform with a higher displacement precision and the choke point of the technology becomes increasingly prominent. Furthermore, when the original objective lens with an objective lens of a corresponding magnification factor is replaced according to the size of the object under testing, the original movable mechanism platform has to also be replaced by a movable mechanism platform with a corresponding precision according to the magnification factor of the new objective lens. As a consequence, when objects of different sizes are measured, the objective lenses of different magnification factors and stepping mechanism platforms of different precisions have to be used and recalibrations have to be made on the optical path of the whole measuring system, which is inconvenient for operation. On the other hand, the object under testing may be unsuitably moved relative to the conventional line-scanning hyper-spectrometer in certain situations; as a result, the user has to purchase or install another measuring system to overcome the special case, which will increase the hardware cost and reduce the measurement efficiency.

Accordingly, the resolution of an image acquired by the conventional measuring system corresponds to the precision of the stepping mechanism platform. To overcome the aforesaid shortcomings, a measuring system in which the resolution of an acquired image is not determined by the precision of the platform displacement as was in the prior art, is desired in the scanning industry.

SUMMARY OF THE INVENTION

The objective of the present invention is to solve the aforesaid problem by providing a microscanning system for acquiring a 2D image through one-dimensional scanning manner and an operating method thereof.

To achieve the aforesaid objective, the present invention provides a microscanning system, which comprises a microscope for acquiring an image of an object under testing to generate an enlarged image, wherein the enlarged image is a two-dimensional (2D) image distributed along the first direction and second direction different from the first direction; a relay lens device disposed behind the microscope for receiving and transferring the enlarged image outputted by the microscope; a stepping motor electrically connected to the relay lens device for linearly moving the relay lens device in the first direction in a stepwise way along the second direction; and a hyper-spectrometer device disposed behind the relay lens device for receiving portions of the enlarged image of the object under testing in the first direction that are transferred by the relay lens device sequentially along the second direction, and for transforming the portions of the enlarged image into corresponding spectrum information. Thereby, the microscanning system of the present invention moves the relay lens device in an 1D scanning manner to generate the 2D image of the object under testing using the hyper-spectrometer.

Furthermore, a microscanning method is disclosed in the present invention for acquiring a 2D image by the one-dimensional scanning The method comprises the following steps: acquiring and enlarging an image of an object under testing for generating an enlarged image, wherein the enlarged image is a 2D image distributed along the first direction and the second direction different from the first direction; receiving the enlarged image; moving the enlarged image in the first direction linearly in a stepwise way along the second direction; receiving portions of the enlarged image of the object under testing in the first direction that are transferred sequentially along the second direction; and transforming the enlarged image into the corresponding spectrum information.

In the microscanning system of the present invention, a higher resolution of the image is obtained and less time is needed for the scanning operation. Furthermore, the microscanning system of the present invention can not only be easily customized according to practical needs but can also effectively reduce the manufacturing and assembly cost of the system, which makes the product better suited to the market demand. Thereby, the drawbacks of the prior art is effectively solved by the present invention.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Because the present invention focuses on the design of a microscanning system, the following description will put emphasis only on the elements of the microscanning system. For simplicity of the attached drawings and for convenience of description, other elements not directly related to the microscanning system will not be described herein. It shall be appreciated that the following embodiments are not intended to limit the present invention to any specific environment, applications or particular implementations described in these embodiments. Furthermore, the attached drawings are all schematic views drawn in a simplified or slightly exaggerative way. The elements shown therein only represent an optional design of the present invention, but not to limit the actual number, shape and dimensions of these elements in practical implementation, so the layout of the elements in practical use may be more complex.

Figure 1:
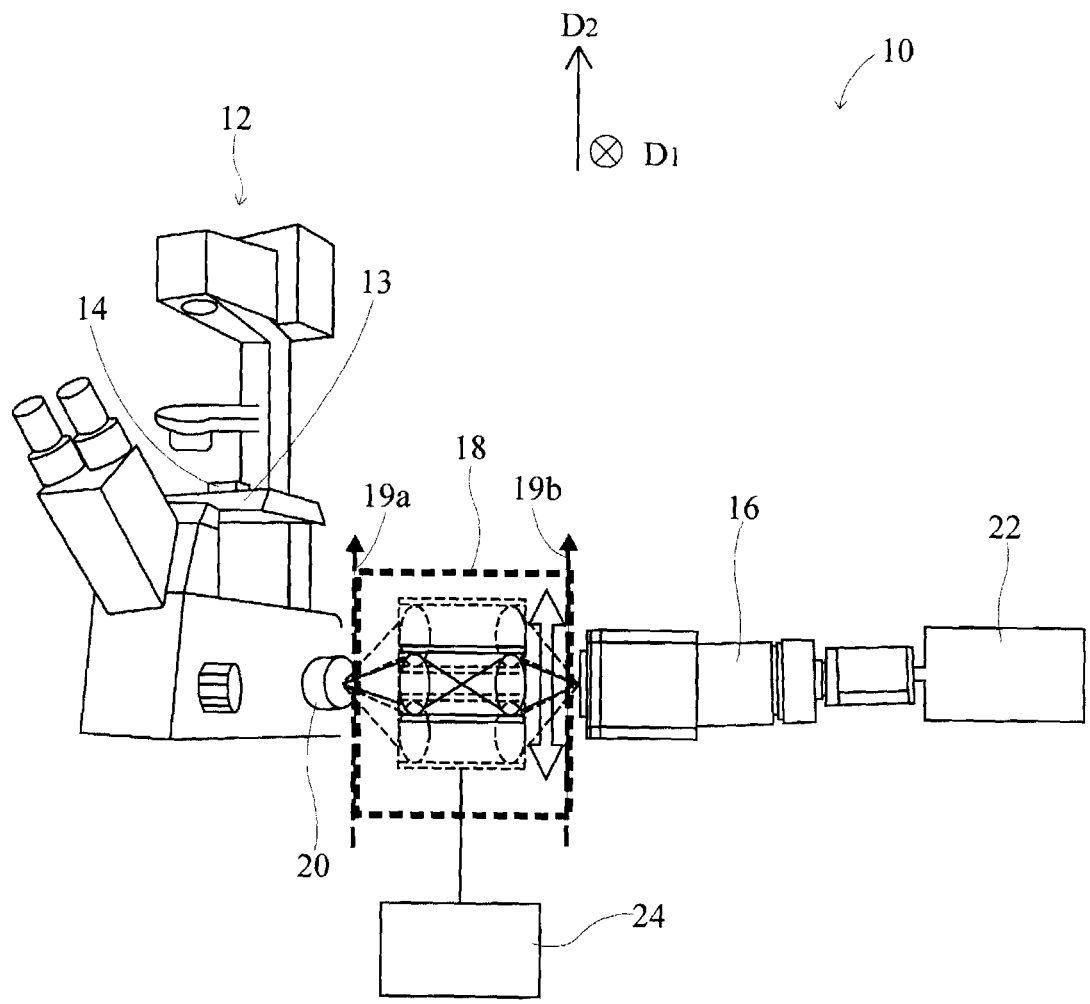
FIG. 1 is a schematic diagram of a microscanning system according to the preferred embodiment of the present invention.

FIG. 1 illustrates a schematic diagram of a microscanning system 10 for acquiring a 2D image by one-dimensional scanning according to the preferred embodiment of the present invention. The microscanning system 10 comprises a microscope 12, a hyper-spectrometer 16, a relay lens device 18 and a stepping motor 24. In detail, the microscope 12, which may be an upright microscope, an inverted microscope, a transmission microscope, a reflecting microscope, a fluorescence microscope and a conventional microscope of the like, is adapted to acquire an image of an object 14 under testing and to enlarge the image to generate an enlarged image (not shown). The light source of the microscope 12 may either be a light emitting diode (LED) light source, a laser light source, a halogen light source, a cold light source, a fluorescent ring light source and a white-color ring light source. It shall be appreciated that the enlarged image is a 2D image, which is distributed along the first direction D1 and second direction D2 different from the first direction D1, for later optical processing as enlarging and scanning on the enlarged image by downstream optical components.

The relay lens device 18 is disposed between the microscope 12 and the hyper-spectrometer 16 for receiving and transferring the enlarged image outputted by the microscope 12. The hyper-spectrometer 16 receives the partially enlarged images of the object 14 from the first direction D1 that are transferred sequentially by the relay lens device 18 along the second direction D2, and for transforming the partially enlarged images into the corresponding spectrum information (the image scanning method of the hyper-spectrometer 16 is described hereinafter). The relay lens device 18 may consist of at least one convex lens and at least one concave lens; and in this preferred embodiment, the relay lens device 18 comprises two biconvex lenses adapted to transfer the enlarged image, although it is not merely limited thereto.

In detail, after the object 14 under testing is placed on a mechanism platform 13 of the microscope 12, the microscope 12 firstly acquires and enlarges an image of the object 14 under testing and transfers the enlarged image to the relay lens device 18. The enlarged image is then transferred by the relay lens device 18 to the hyper-spectrometer 16 so that the hyper-spectrometer 16 receives the partially enlarged images of the object 14 in the first direction D1, and transforms the partially enlarged images into the corresponding spectrum information. In this embodiment, the relay lens device 18 preferably comprises at least one finite conjugate relay lens, which transforms the first image plane 19a into a second image plane 19b on a scale of 1:1, so that the enlarged image can be presented at the front end of the hyper-spectrometer 16. This makes it easier for the hyper-spectrometer 16 to accurately receive the enlarged image of the object 14 under testing.

Additionally, the microscanning system 10 may further comprise an engagement mechanism 20 disposed between the microscope 12 and the relay lens device 18. The relay lens device 18 is tightly engaged with the microscope 12 by the engagement mechanism 20. For example, the engagement mechanism 20 may be a C Mount or an F Mount for use as an image transmitting window, although it is not limited thereto.

The microscanning system 10 may further comprise a charge coupled device (CCD) sensor 22 electrically connected to the hyper-spectrometer 16. The CCD sensor 22 acquires and records the spectrum information (e.g., the wavelengths and positions of the image) of the enlarged image that is obtained by the hyper-spectrometer 16 through one-dimensional scanning to generate an enlarged 2D image.

Figure 2:
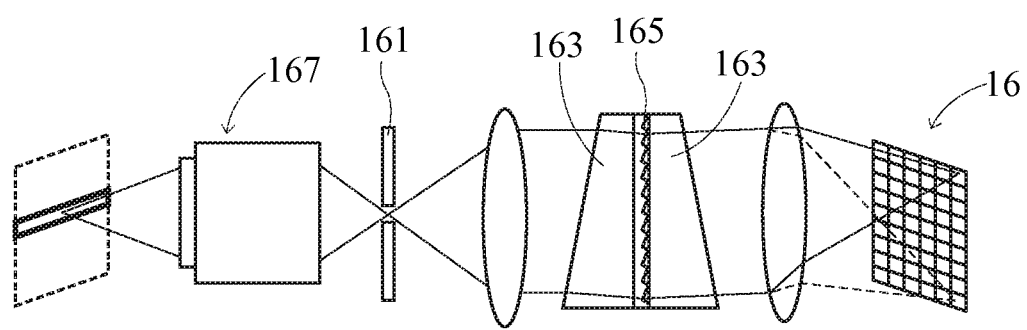
FIG. 2 is a schematic diagram of a hyper-spectrometer according to the preferred embodiment of the present invention.

FIG. 2 illustrates a schematic diagram of the hyper-spectrometer 16 in the preferred embodiment of the present invention. The hyper-spectrometer 16 comprises a slit unit 161, a prism set 163, a light-splitting grating 165 and an objective lens 167. The slit unit 161 is an optical screen with an optical slit that is substantially parallel to the first direction D1. The prism set 163 is disposed on the side of the slit unit 161, the light-splitting grating 165 is disposed on the same side of the slit unit 161 and the same side as the prism set 163, and the objective lens 167 is disposed on the other side of the slit unit 161.

The objective lens 167 is adapted to receive partially enlarged images of the object 14 in the first direction D1 and to project the partially enlarged images to the prism set 163 and the light-splitting grating 165 via the slit unit 161. Thereby, the enlarged image 14 of the object 14 under testing and spectrum information thereof can be acquired.

To acquire partially enlarged images of the object 14 in the first direction D1 through scanning by the hyper-spectrometer 16, the microscanning system 10 further comprises a stepping motor 24 and firmware (not shown) with dedicated control software, both of which are electrically connected to the relay lens device 18. The dedicated software can control the individual devices described above; specifically, the dedicated software can drive the stepping motor 24 and the hyper-spectrometer 16 for acquiring an image and the corresponding spectrum for optical analysis. In particular, the stepping motor 24 can linearly move the relay lens device 18 in the first direction D1 in a stepwise manner along the second direction D2, so that partially enlarged images of the object 14 in the first direction D1 can be transferred to the hyper-spectrometer 16 by the relay lens device 18 sequentially along the second direction D2. For example, the dedicated software can control the stepping motor 24 to, stepwise in a plurality of steps from bottom to top, reciprocate the relay lens device 18 linearly in the first direction D1 so that the enlarged image presented on the second image plane 19b can be projected into the hyper-spectrometer 16 via the optical slit of the slit unit 161 in a one-dimensional linear way. By repeating this operation stepwise from bottom to top, a complete 2D image will be presented on the CCD sensor 22.

It shall be noted that the speed of the relay lens device 18 moved by the stepping motor 24 can be dynamically adjusted in an optimal way depending on the magnification factor of the microscope 12. After the partial enlarged images of the object 14 in the first direction D1 generated by the hyper-spectrometer 16 has been acquired by the CCD sensor 22 sequentially along the second direction D2, 2D imaging can be accomplished by combining the partially enlarged images. Here, the first direction D1 is substantially perpendicular to the second direction D2. In this embodiment, as the first direction D1 is in the X direction, the coordinates of the image adopted by the hyper-spectrometer 16 are (X, $\lambda$) and the relay lens device 18 moves in the second direction D2 (i.e., the Y direction); likewise, in a variant of this embodiment, as the first direction D1 is in the Y direction, the coordinates of the image adopted by the hyper-spectrometer 16 are (Y, $\lambda$) and the relay lens device 18 moves in the second direction D2 (i.e., the X direction).

In the present invention, using the relay lens device 18 to scan an image can deliver a higher resolution of the image and lower cost of the equipment than using the mechanism platform 13 of the microscope 12 to scan the image. For instance, when the object 14 under testing has an area of 1 mm×1 mm and the microscope 12 has a magnification factor of $10^2$, the image of the object 14, after being enlarged by the microscope 12, will have an area of 10 mm×10 mm. However, it shall be appreciated that when n=10, the microscope 12 must be used with a stepping mechanism platform that has a micro-stepping precision of 0.1 mm and must be matched with the microscope 12 to accomplish the conventional two-dimensional scanning of splitting the 1 mm×1 mm area into 10×10 dot images. In contrast, when n=10, the relay lens device 18 of the present invention only utilizes the stepping motor 24 that has a micro-stepping precision of 1 mm to accomplish the one-dimensional scanning of splitting the 1 mm×1 mm area into 10 lines. As can be known from the above description, the relay lens device 18 of the present invention directly processes the image that has been enlarged (e.g., enlarged from the nanoscale to the microscale) by the microscope 12, so it is unnecessary for the stepping motor to have an extremely high precision. Therefore, a high image resolution that would otherwise necessitate the use of a high-precision stepping mechanism platform in the conventional two-dimensional scanning technology can be achieved easily by the use of a low-precision stepping motor 24 according to the present invention, which economizes the equipment cost.

Furthermore, because it is possible to significantly increase the moving speed of the low-precision stepping motor 24 used in the present invention, the scanning period by the whole scanning operation is shortened. In the above embodiment, by virtue of the fact that the microscope 12 is able to process a fine optical image with stable and superior quality, the image of the object 14 under testing can be easily combined and enlarged by the microscope 12 in advance. Only a low-precision stepping motor 24 is needed to obtain a high image resolution that would otherwise be difficult to be achieved by a conventional high-precision stepping mechanism platform. From another viewpoint, as the stepping motor 24 with a micro-stepping precision of 0.1 mm is used in the present invention, a one-dimensional scanning of splitting the image of the object 14 under testing into 100 lines can be accomplished to result in an image resolution much greater than that of the conventional technology.

In detail, after n partial images of the object 14 in the first direction D1 are derived sequentially by the objective lens 167 of the hyper-spectrometer 16, the corresponding spectrum information of these partial images can be obtained by means of the slit unit 161, the prism set 163 and the light-splitting grating 165; finally, the corresponding spectrum information of these partial images is transmitted to the CCD sensor 22 for generating the 2D image. In the present invention, dedicated software is used to drive the stepping motor 24, the hyper-spectrometer 16 and the CCD sensor 22 by the microscanning system 10, so that the hyper-spectrometer 16 can accurately acquire the image transferred by the relay lens device 18 according to the moving speed of the stepping motor 24, and the CCD sensor 22 can integrate the n single-line images acquired by the hyper-spectrometer 16 into the 2D image according to the moving speed of the stepping motor 24.

Figure 3:
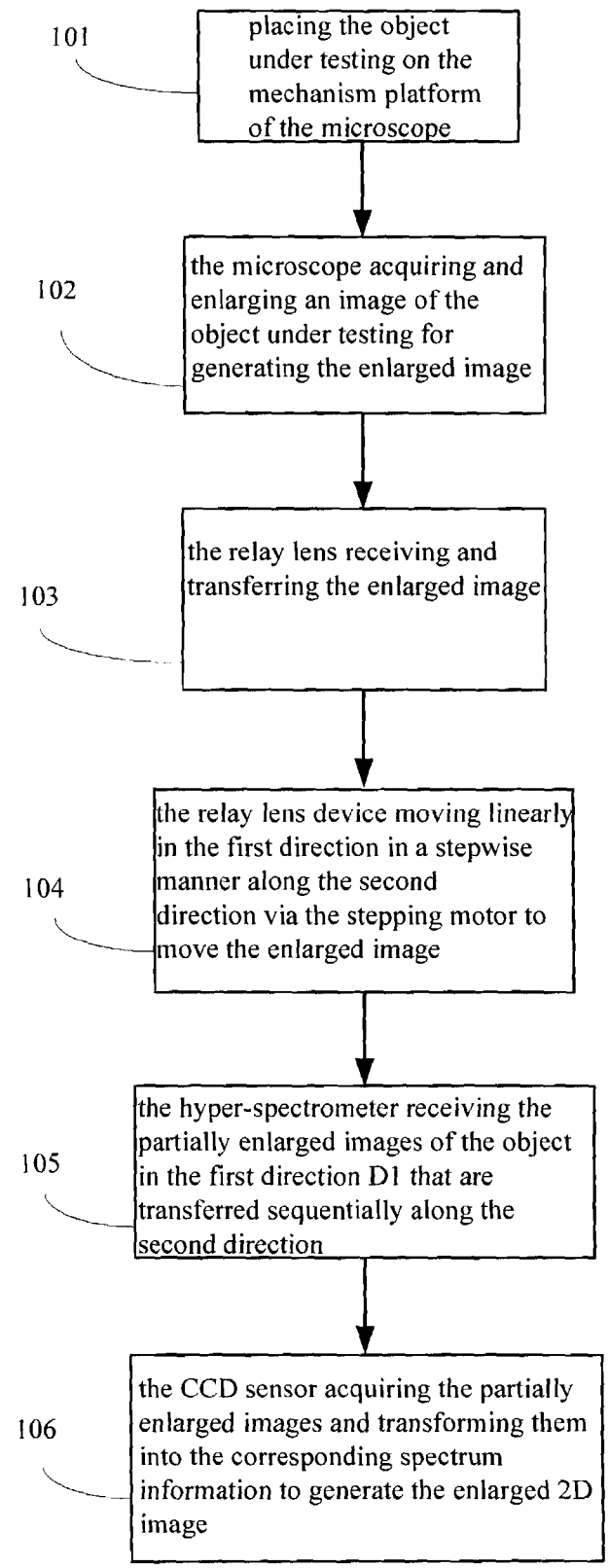
FIG. 3 is a flowchart of a microscanning method according to the preferred embodiment of the present invention.

FIG. 3 illustrates a flowchart of a microscanning method for acquiring the 2D image by using one-dimensional scanning according to the preferred embodiment of the present invention. Steps of this method are as follows:

Step 101: The object 14 under testing is placed on the mechanism platform 13 of the microscope 12.

Step 102: The microscope 12 acquires and enlarges an image of the object 14 under testing for generating the enlarged image.

Step 103: The relay lens device 18 receives and transfers the enlarged image.

Step 104: The relay lens device 18 moves linearly in the first direction D1 in a stepwise manner along the second direction D2 via the stepping motor 24 to move the enlarged image.

Step 105: The hyper-spectrometer 16 receive the partially enlarged images of the object 14 in the first direction D1 that are transferred sequentially along the second direction D2.

Step 106: The CCD sensor 22 acquires the partially enlarged images and transforms them into the corresponding spectrum information to generate the enlarged 2D image.

Now, these steps will be described in detail. First, the object 14 under testing is placed on the mechanism platform 13 of the microscope 12. The microscope 12 acquires the enlarged image of the object 14 and transmits it to the relay lens device 18, which then extends into the optical path of the image of the object 14 and transfers the enlarged image to the hyper-spectrometer 16. The hyper-spectrometer 16 acquires the single-line images of the object 14 in the first direction D1 by means of only the objective lens 167. With the dedicated software, the stepping motor 24 is driven to move the relay lens device 18 accurately along the second direction D2. For instance, in this preferred embodiment, the first line image, the second line image, . . . , and the nth line image of the object 14 in the first direction D1 can be, from bottom to top or from top to bottom, sequentially transferred to the hyper-spectrometer 16. Finally, the hyper-spectrometer 16 transforms the received partial enlarged images of the object 14 into the corresponding spectrum information.

Compared to the prior art, the microscanning system and the operating method thereof of the present invention moves the relay lens device into the one-dimensional direction so that the relay lens device can scan the whole image of the object under testing in a stepwise manner along the direction. Thus, a plurality of partially enlarged images of the object in the first direction is transferred sequentially to the hyper-spectrometer so that the plurality of partial enlarged images of the object can be integrated into a 2D image by the CCD sensor. Therefore, by virtue of the fine enlarged optical image provided by the microscope and, tactfully, through the dynamic and special design of the relay lens device, the microscanning system of the present invention can improve the image resolution and shorten the scanning time as compared to the conventional technology. Therefore, the microscanning system of the present invention can not only be easily customized depending on practical needs but can also decrease the manufacturing and assembly cost of the system, which makes the product better suited for market demands.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A microscanning system, comprising:
   a microscope, being adapted to acquire an image of an object under test and enlarge the image to generate an enlarged image, wherein the enlarged image is a two-dimensional (2D) image distributed along a first direction and a second direction different from the first direction;
   a relay lens device disposed behind the microscope, being adapted to receive and transfer the enlarged image outputted by the microscope;
   a stepping motor electrically connected to the relay lens device, being adapted to, in a stepwise way along the second direction, reciprocate the relay lens device linearly;
   a firmware electrically connected to the relay lens device, having a software configured to drive the stepping motor, wherein the stepping motor subsequently dynamically adjusts a speed of the relay lens depending on a magnification factor;
   a hyper-spectrometer;
   device disposed behind the relay lens device, being adapted to receive portions of the enlarged image of the object under test in the first direction that are transferred by the relay lens device sequentially along the second direction, and transform the portions of the enlarged image into corresponding spectrum information; and
   a mount disposed between the microscope and the relay lens device, wherein the relay lens device is engaged onto the microscope by the mount.

2. The microscanning system as claimed in claim 1, wherein the first direction is substantially perpendicular to the second direction.

3. The microscanning system as claimed in claim 1, wherein the hyper-spectrometer comprises:
   a slit unit;
   a prism set disposed on a side of the slit unit;
   a light-splitting grating disposed on the side of the slit unit; and
   an objective lens disposed on the other side of the slit unit, being adapted to receive the enlarged image of the object under test and project, via the slit unit, the enlarged image to the prism set and the light-splitting grating for light splitting, so as to obtain the spectrum information of the enlarged image.

4. The microscanning system as claimed in claim 1, wherein the relay lens device comprises at least one convex lens and at least one concave lens.

5. The microscanning system as claimed in claim 1, wherein the relay lens device comprises two biconvex lenses for transferring the enlarged image.

6. The microscanning system as claimed in claim 1, further comprising:
   a charge coupled device (CCD) sensor electrically connected to the hyper-spectrometer, being adapted to acquire the spectrum information of the enlarged image obtained through one-dimensional scanning by the hyper-spectrometer, so as to generate an enlarged 2D image.

7. The microscanning system as claimed in claim 1, wherein the microscope is one of an upright microscope, an inverted microscope, a transmission microscope, a reflecting microscope and a fluorescence microscope.

8. The microscanning system as claimed in claim 1, wherein the microscope comprises a light source which is one of a light emitting diode (LED) light source, a laser light source, a halogen light source, a cold light source, a fluorescent ring light source and a white-color ring light source.

* * * * *